(12) United States Patent
Stählin et al.

(10) Patent No.: US 8,682,285 B2
(45) Date of Patent: Mar. 25, 2014

(54) POSITIONING SIGNAL FOR RESCUE FORCES

(75) Inventors: Ulrich Stählin, Eschborn (DE); Ralf Merzbacher, Hofheim (DE); Marc Menzel, Marburg (DE); Carsten Birke, Frankfurt am Main (DE); Maik Schäfer, Friedrichshafen-Kluftern (DE); Ulrich Möller, Holzkirchen (DE)

(73) Assignee: Continental Teves AG & Co. oHG (DE)

( * ) Notice: Subject to any disclaimer, the term of this patent is extended or adjusted under 35 U.S.C. 154(b) by 339 days.

(21) Appl. No.: 12/937,481

(22) PCT Filed: Apr. 2, 2009

(86) PCT No.: PCT/EP2009/053926
§ 371 (c)(1),
(2), (4) Date: Jan. 14, 2011

(87) PCT Pub. No.: WO2009/127524
PCT Pub. Date: Oct. 22, 2009

(65) Prior Publication Data
US 2011/0177791 A1    Jul. 21, 2011

(30) Foreign Application Priority Data

| Apr. 14, 2008 | (DE) | 10 2008 018 751 |
| Oct. 21, 2008 | (DE) | 10 2008 043 001 |
| Oct. 22, 2008 | (DE) | 10 2008 043 050 |
| Oct. 22, 2008 | (DE) | 10 2008 043 083 |

(51) Int. Cl.
*H04M 3/00* (2006.01)
*H04M 11/00* (2006.01)
*H04W 24/00* (2009.01)
*H04M 1/00* (2006.01)

(52) U.S. Cl.
USPC ..... 455/404.2; 455/418; 455/419; 455/456.1; 455/574

(58) Field of Classification Search
USPC ............... 455/41.2, 404.1–404.2, 418–420, 455/423–425, 433–434, 456.1–456.3, 455/456.5–456.6, 500, 517, 521, 550.1, 455/561, 563–565, 569.3, 90.1, 455/343.1–343.5, 456.1–456.2, 457, 455/569.1–569.2, 573–574, 575.9; 701/32.3–32.4, 302, 495, 32.2–32.3, 701/513–517; 340/6.1, 8.1, 9.1, 902, 340/426.19–426.2, 539.13–539.17, 340/989–993
See application file for complete search history.

(56) References Cited

U.S. PATENT DOCUMENTS 5,081,667 A    1/1992   Drori et al.
6,675,081 B2 *  1/2004   Shuman et al. ............. 701/48
(Continued)

FOREIGN PATENT DOCUMENTS

DE    19800550 A1   11/1999
DE    10141539 A1    3/2003
(Continued)

*Primary Examiner* — Meless Zewdu
(74) *Attorney, Agent, or Firm* — RatnerPrestia

(57) ABSTRACT

An emergency call unit for a vehicle includes not only a detection unit, a position-finding unit and a control unit, but also a transmission unit for the repeated transmission of a locating signal to a rescue worker. In this context, the locating signal may correspond to the position of the vehicle, and the transmission of the locating signal is initiated by a trigger event. By way of example, the trigger event is a request from a rescue worker or is the detection of an accident.

16 Claims, 2 Drawing Sheets

(56) References Cited

U.S. PATENT DOCUMENTS

| | | | |
|---|---|---|---|
| 6,946,977 B2* | 9/2005 | Chen et al. | 340/988 |
| 7,532,107 B2* | 5/2009 | Hara et al. | 340/426.1 |
| 7,574,195 B2* | 8/2009 | Krasner et al. | 455/404.2 |
| 8,032,108 B2* | 10/2011 | Kuz et al. | 455/404.1 |
| 8,180,316 B2* | 5/2012 | Hwang | 455/404.1 |
| 2005/0200479 A1* | 9/2005 | James | 340/539.18 |
| 2005/0202801 A1* | 9/2005 | Banet et al. | 455/404.1 |
| 2006/0089790 A1* | 4/2006 | Dupuis | 701/207 |
| 2007/0066276 A1* | 3/2007 | Kuz et al. | 455/404.1 |
| 2007/0287409 A1* | 12/2007 | Hwang | 455/404.1 |
| 2008/0013484 A1* | 1/2008 | Chang et al. | 370/328 |
| 2008/0084473 A1* | 4/2008 | Romanowich | 348/135 |
| 2008/0132199 A1* | 6/2008 | Hirata | 455/404.2 |
| 2008/0284587 A1* | 11/2008 | Saigh et al. | 340/539.13 |

FOREIGN PATENT DOCUMENTS

| | | |
|---|---|---|
| DE | 10338242 B3 | 1/2005 |
| DE | 102006033956 A1 | 1/2008 |
| DE | 202006018666 U1 | 5/2008 |
| DE | 102008018868 A1 | 10/2008 |
| WO | WO 98/59256 | 12/1998 |

* cited by examiner

POSITIONING SIGNAL FOR RESCUE FORCES

CROSS REFERENCE TO RELATED APPLICATIONS

This application is the U.S. national phase application of PCT International Application No. PCT/EP2009/053926, filed Apr. 2, 2009, which claims priority to German Patent Application No. 10 2008 018 751.8, filed Apr. 14, 2008, German Patent Application No. 10 2008 043 001.3, filed Oct. 21, 2008, German Patent Application No. 10 2008 043 083.8, filed Oct. 22, 2008, and German Patent Application No. 10 2008 043 050.1, filed Oct. 22, 2008, which are all incorporated herein by reference in their entirety.

FIELD OF THE INVENTION

The invention relates to the coordination of rescue efforts. In particular, the invention relates to an emergency call unit for a vehicle, a vehicle having an emergency call unit, a method for the repeated transmission of a locating signal to a receiver on an emergency worker, a program element and a computer-readable medium.

BACKGROUND OF THE INVENTION

An automated emergency call (eCall) can be used to alert rescue workers who are intended to come to the aid of the occupants of a vehicle involved in an accident. Together with the eCall, it is possible for further information about the accident and the vehicle to be transmitted.

However, if this information is insufficient, for example because the position information is too inaccurate (the 112 eCall in the EU prescribes an accuracy of ±150 m in 95% of cases), or because the emergency workers still require further information, the rescue effort can be slowed down or even rendered impossible.

SUMMARY OF THE INVENTION

It is an object of the invention to allow a rescue effort for a driver of a vehicle involved in an accident to be speeded up.

The invention specifies an emergency call unit for a vehicle, a vehicle having an emergency call unit, a method for the repeated transmission of a locating signal to a receiver on an emergency worker by a transmission unit in a vehicle, a program element and a computer-readable medium in accordance with the aspects of the invention.

The exemplary embodiments described relate in equal measure to the emergency call unit, the vehicle, the method, the program element and the computer-readable medium. In other words, the features cited below in respect of the emergency call unit, for example, can also be implemented as method steps, program modules for the program element or in the computer-readable medium, and vice versa.

In line with one exemplary embodiment of the invention, an emergency call unit for a vehicle is specified which has a position-finding unit for finding a position for the vehicle, a control unit for producing a locating signal and a transmission unit for the repeated transmission of the locating signal to a receiver. The locating signal allows the vehicle to be found. The repeated transmission of the locating signal is triggered by the trigger event.

In line with a further exemplary embodiment of the invention, the emergency call unit has a position-finding unit for finding a position for the vehicle, wherein the locating signal is based on the position found.

In other words, the emergency call unit is capable of determining the position of the vehicle and of repeatedly transmitting this locating signal to the receiver, which may be a mobile reception unit on an emergency worker, for example. The transmission of the locating signal helps the emergency workers to find the vehicle and is of great value particularly in cases in which an automated emergency call (eCall) contains insufficient information.

The locating signal may be a signal which contains information about the position of the vehicle. Alternatively, it may be a defined bit sequence, similar to Morse code, which signifies that there is an emergency situation (that is to say an "SOS" signal, for example). This signal can then be analyzed by the rescue workers and located in order to ascertain the position of the vehicle.

Since the locating signal is transmitted repeatedly, emergency workers called in later can also receive the locating signal, even if they have not received the preceding eCall, for example.

In line with a further exemplary embodiment of the invention, the transmission unit is a radio key (wireless driving authorization unit) for the vehicle or a vehicle (that is to say provided and possibly permanently installed in the vehicle) transmitter/receiver.

The transmission unit is thus decoupled from a possible eCall module in the vehicle. This provides redundancy in the transmission of information to the emergency workers, which increases the probability of important information actually being received by the emergency workers. This allows significant speeding up of the rescue effort.

In line with a further exemplary embodiment of the invention, the emergency call unit is designed for transmitting the locating signal at regular intervals of time.

In line with a further exemplary embodiment of the invention, the transmission unit is designed for transmitting the locating signal on the basis of the following communication standards: WLAN 802.11p, WLAN 802.11a/b/g/n, WiMax, Bluetooth, ZigBee or cellular radio.

In particular, the transmission unit may be designed such that it transmits the locating signal (and possibly further information) in parallel or at offset times on different communication paths and, by way of example, the emergency call unit uses short range communication and additionally cellular radio (mobile radio) for this.

There may also be a plurality of individual transmission units provided. In particular, it is possible for the additional transmission unit used to be a mobile radio telephone of the driver which receives a transmission containing the information for the locating signal and possibly the additional information from the control unit of the emergency call unit. This transmission can be made in wired fashion, for example if the mobile radio telephone is connected to the control unit by means of a cable connection, or else wirelessly, for example using short range communication (such as Bluetooth).

In particular, it should be pointed out at this juncture that the signals within the emergency call unit can be transmitted both in wired fashion and wirelessly between the individual components of the emergency call unit (for example between the control unit and the transmission unit), depending on the embodiment of the emergency call unit.

In line with a further exemplary embodiment of the invention, both an accident involving the vehicle and an electronic emergency call (eCall) already sent by the vehicle are assessed by the emergency call unit as a trigger event.

By way of example, the repeated transmission of the locating signal to the receiver thus takes place only when an eCall has already been sent. It is also possible for a locating signal to be sent only when the detection unit has detected an accident involving the vehicle. In this case, the transmission of the locating signal is independent of whether or not an eCall is actually sent.

In line with a further exemplary embodiment of the invention, the emergency call unit is designed for receiving a search signal which is transmitted by the receiver, wherein the search signal is assessed by the emergency call unit as a trigger event.

This allows a rescue worker to request a locating signal and possibly additional information from the vehicle involved in an accident if such information is required.

This allows the emergency call unit to save energy, since locating signals are not sent continually. The locating signals are sent only when they are actually requested, for example.

In line with a further exemplary embodiment of the invention, the search signal is assessed by the emergency call unit as a trigger event only if an accident involving the vehicle or the sending of an electronic emergency call has been detected beforehand.

This makes it possible to prevent the locating signal from being able to be requested even when there is no cause to do so, because the vehicle has not been involved in an accident at all.

In line with a further exemplary embodiment of the invention, the emergency call unit is designed for the parallel transmission of the locating signal on a plurality of transmission paths. This redundancy allows safety to be increased further.

In line with a further exemplary embodiment of the invention, the control unit is designed for forwarding further data or information to the transmission unit. These further data can be transmitted together with the locating signal or in series with the locating signal. In particular, it is possible for the emergency workers to be able to retrieve the information explicitly. By way of example, it may be important for an emergency worker to be provided with a rescue guideline in a particular language. This can be requested from the emergency call unit and is then transmitted.

In line with a further exemplary embodiment of the invention, the transmission unit is designed for transmitting the locating signal and further information to adjacent vehicles.

Vehicles which have an appropriate emergency call unit can then forward this information to a rescue control center or to the emergency workers.

In line with a further exemplary embodiment of the invention, the emergency call unit is designed for receiving a control signal which is transmitted by the receiver, wherein the received control signal is designed for controlling a function of a system component in the vehicle.

This allows the rescue workers to activate the horn or the lights of the vehicle, for example. This allows finding the vehicle to be facilitated.

In line with a further exemplary embodiment of the invention, a report signal which is received by the emergency call unit and which relates to a reported theft of the vehicle is assessed by the emergency call unit as a trigger event.

If the vehicle is reported as stolen, the report signal can be sent by an appropriate (possibly certified) control center or directly by the owner of the vehicle (for example by inputting an appropriate identification code into his mobile telephone). The emergency call unit then automatically sends the locating signal, as a result of which the vehicle can then be found.

In line with a further exemplary embodiment of the invention, a vehicle with an emergency call unit as described above and below is specified.

In line with a further exemplary embodiment of the invention, a method for the repeated transmission of a locating signal to a receiver on an emergency worker by a transmission unit in a vehicle is specified. The method involves a trigger event being detected. The production and repeated transmission of a locating signal is then triggered by the trigger event. In addition, the locating signal is produced. In a further step, the repeated transmission of the locating signal to the receiver then takes place, wherein the locating signal allows rescue forces to find the vehicle position.

In line with a further exemplary embodiment of the invention, a program element is specified which, when executed on a processor of an emergency call unit in a vehicle, instructs the processor to perform the steps specified above and below.

In line with a further exemplary embodiment of the invention, a computer-readable medium is specified which stores a program element which, when executed on a processor of an emergency call unit in a vehicle, instructs the processor to perform the steps specified above and below.

Exemplary embodiments of the invention are described below with reference to the figures.

BRIEF DESCRIPTION OF THE DRAWING FIGURES

The invention is best understood from the following detailed description when read in connection with the accompanying drawings. Included in the drawings is the following figures.

DETAILED DESCRIPTION OF THE EXEMPLARY EMBODIMENTS

Figure 1:
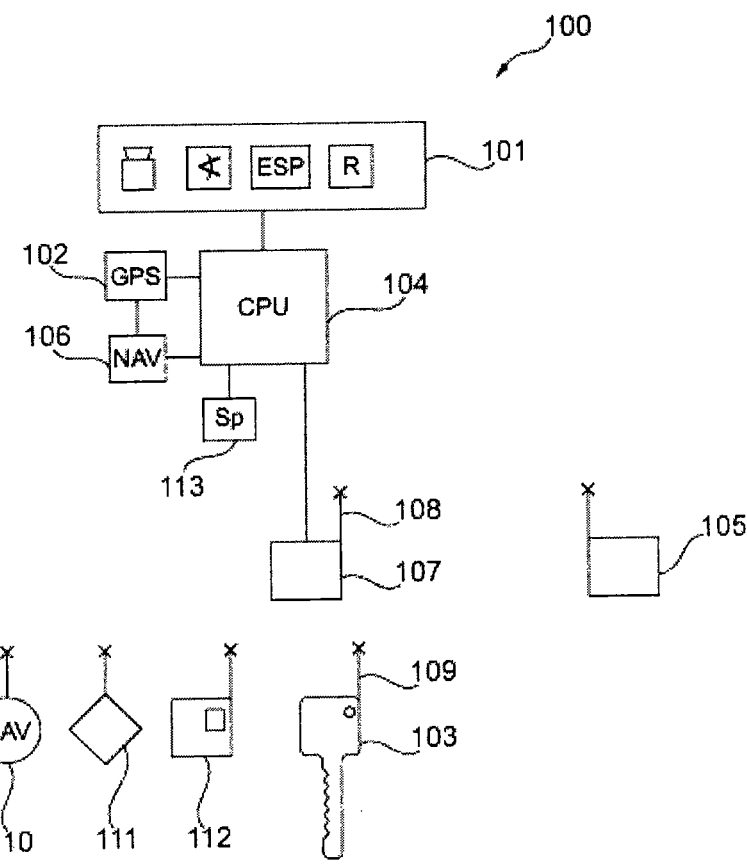
FIG. 1 shows an emergency call system with an emergency call unit 100 and a receiver 105 based on an exemplary embodiment of the invention.

The illustrations in the figures are schematic and not to scale.

In the description of the figures which follows, the same reference numerals are used for the same or similar elements.

FIG. 1 shows an emergency call system with an emergency call unit 100 and a receiver 105 based on an exemplary embodiment of the invention.

The emergency call unit 100 has a central control unit 104 to which, by way of example, a detection unit 101, a satellite navigation receiver 102, a navigation unit 106 and a communication unit 107 with an antenna 108 are connected. This communication unit may be the vehicle transceiver of an RKE (Remote Keyless Entry) system, for example, or else WLAN modules based on IEEE802.11a/b/g/n/p, WiMax, Bluetooth, ZigBee, cellular radio, etc.

In addition, the emergency call unit 100 has a plurality of additional transmission units. These are a radio key 103 with an antenna 109, a mobile telephone 112, a communication unit 111 installed permanently in the vehicle and a mobile navigation appliance 110, for example.

The various transmitters 107, 110, 111, 112, 103 may be designed such that they each use different transmission techniques, such as RKE (Remote Keyless Entry), DSRC, WiMax, Bluetooth or cellular radio.

This allows the provision of redundancy in the signal transmission, which can further increase the probability of the data being transmitted safely.

By way of example, the receiver 105 may be a mobile telephone on a rescue worker or else the receiver in a rescue control center.

At this juncture, it should be pointed out that the vehicle may be a motor vehicle, such as a car, bus or heavy goods vehicle, or else a rail vehicle, a ship, an aircraft, such as a helicopter or airplane, or may be a motorcycle, for example.

In addition, it should be pointed out that, within the context of the present invention, the positioning unit 102 (see FIG. 1) is, by way of example a global navigation satellite system (GNSS), for example GPS, Galileo, GLONASS (Russia), Compass (China), IRNSS (India).

Figure 2:
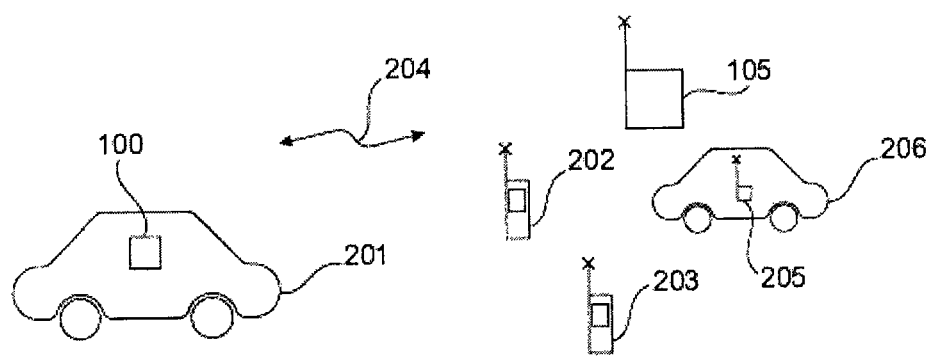
FIG. 2 shows an emergency call system based on an exemplary embodiment of the invention, wherein at least a portion of the emergency call unit is installed in the vehicle.

FIG. 2 shows a further illustration of an emergency call system based on an exemplary embodiment of the invention. The emergency call unit 100 is installed in a vehicle 201, wherein the transmission unit(s) 103 may be mobile (that is to say not permanently installed) transmission units, for example a radio key and/or a mobile telephone.

In addition, a plurality of receivers 105, 202, 203 are provided. By way of example, the receiver 105 is a rescue control center and the receivers 202, 203 are mobile telephones on rescue workers.

In addition, a receiver 205 may be provided which is integrated in a vehicle 206.

The data transmission takes place wirelessly via the radio transmission path 204. Various radio standards can be used for the data transmission.

Figure 3:
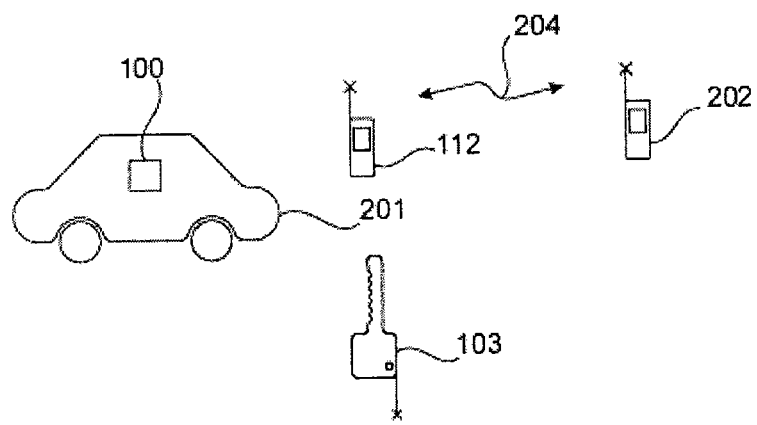
FIG. 3 shows an emergency call system based on an exemplary embodiment of the invention with a radio key and a mobile telephone as transmitter.

FIG. 3 shows an emergency call system based on a further exemplary embodiment of the invention. A portion of the emergency call unit 100 is permanently installed in the vehicle 201. The various transmission units 112, 103 of the emergency call unit are located outside of the vehicle, since the occupants have left the vehicle and are carrying these transmission units with them.

If the detection unit 101 (see FIG. 1) in the vehicle has detected an accident (e.g. by virtue of the sensor system of the passive safety systems in the vehicle) and/or if an eCall has been sent, the vehicle emits a locating signal at regular intervals.

This locating signal enables the rescue workers to use a receiver to locate vehicles and hence significantly reduce the search time, even under poor visibility conditions or when vehicles have left the road. The locating signal can be transmitted using the technology for the radio key (both the vehicle transceiver and the actual key) of the vehicle, since many vehicles today are already equipped with such a radio key. Other transmission techniques are also possible and desired, however, such as DSRC (WLAN IEEE 802.11p, WLAN IEEE 802.11a/b/g/n), WiMax, Bluetooth, ZigBee and mobile radio. These different communication techniques can be used simultaneously or serially.

If the battery charge state of the vehicle battery has dropped below a particular value (that is to say is classified as critical), the locating signal is emitted only after a search signal has been received. This search signal is sent by the rescue workers.

In order to ensure data protection, the emergency call unit reacts to a search signal only after an accident and/or an eCall. This ensures that a vehicle cannot be "sounded out" when there is no emergency.

In addition to the locating signal, it is possible for further information to be transmitted from the vehicle. This information can be used by the rescue workers to obtain a better picture of the situation, even if the vehicle is found immediately (because it is on the road).

Possible additional data are vehicle color (for more simple finding and identification of the vehicle) vehicle type (likewise for simple finding and identification of the vehicle), vehicle type (likewise for more simple finding and identification), tank fill level, charge state of the battery, chassis number and/or the identifier of the emergency call sent.

The identifier of the emergency call sent is also jointly sent in the case of an eCall. This makes it possible to prevent one of the emergency call vehicles from being forgotten whenever a plurality of emergency calls are sent from the same area, for example because the emergency call vehicle (vehicle involved in an accident) associated with the first emergency call has left the road and the vehicle associated with the second emergency call is on the road.

The transmission of the chassis number may be important, since this can be used to request or consult further information, such as rescue guidelines. Particularly in the case of vehicles with airbags, hybrid vehicles or $H_2$ vehicles, this is important because cuts at the wrong points when freeing trapped persons can result in danger for rescuers and vehicle occupants.

If a communication interface with a relatively large bandwidth is available, the relevant rescue guideline can be transmitted directly to the emergency workers via this communication interface. The rescue guideline can be stored in the vehicle, for example in the memory 113 (see FIG. 1). This makes it possible to prevent incorrect association of the chassis number and rescue guideline by the rescue workers. Furthermore, it is possible to prevent the rescue guideline from first having to be obtained in time-consuming fashion if the rescue workers do not have it. With today's large number of vehicle types and model variants, this is a significant simplification of the work for the rescue workers. By way of example, the rescue guideline may be stored in an internationally standardized format (e.g. PDF) and in a plurality of languages in the emergency call unit so that journeys across national borders do not present a problem either.

The locating signal and the additional information which are transmitted via the transmission unit(s) allow the work of the rescue workers to be facilitated and hence the time to rescue to be shortened. When communication technologies which are already present in the vehicle (e.g. key radio, DSRC, etc.) are used, the additional hardware complexity for installing the emergency call unit and hence the corresponding installation costs are low.

Figure 4:
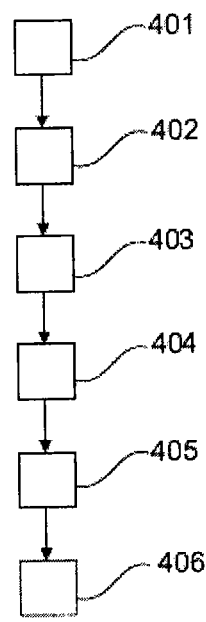
FIG. 4 shows a flowchart for a method based on an exemplary embodiment of the invention.

FIG. 4 shows a flow chart for a method based on an exemplary embodiment of the invention in which an accident involving the vehicle is detected in step 401. In step 402, a locating signal is produced which, by way of example, corresponds to the vehicle position or is used to obtain a bearing for the vehicle. In step 403, this locating signal is transmitted to emergency workers together with further information, such as the chassis number of the vehicle. In step 404, a request by the rescue workers is received in the emergency call device in the vehicle, whereupon the emergency call device transmits the rescue guideline for the vehicle and a further locating signal to the rescue workers. This involves the use of a fast communication link.

In step 405, a control signal is transmitted by the rescue workers, whereupon the horn of the vehicle is activated in step 406 in order to facilitate finding of the vehicle.

Further exemplary embodiments of the invention are described below.

Today's systems for preventing accidents examine the surroundings of the vehicle, recognize the threat of an accident and attempt to prevent the accident, for example by braking automatically. If the accident still occurs, an automatic emergency call (eCall) is sent. These systems therefore provide a large amount of information in the vehicle which may also be useful for other vehicles.

Part of such a system may be the detection unit 101, which has a camera, a steering wheel angle sensor, an ESP sensor system and a radar sensor and also, if necessary, additional sensors, for example.

The transmission unit of the emergency call device 100 (see FIG. 1), particularly the radio key 103, can be used to send information about a possible accident to other vehicles. It is therefore possible to warn the traffic, and hence also improve safety at the site of an accident, even before the site of an accident is marked with a warning triangle.

By way of example, the warning is transmitted such that it does not matter what method is used to handle the "normal" driving authorization (using the radio key), i.e. such that it is a simple matter for warnings to be exchanged and understood regardless of manufacturer. In line with one exemplary embodiment of the invention, the control program for this and also the additionally required hardware can readily be retrofitted into an already existing driver assistance system or emergency call system.

In addition to or instead of the communication by means of the driving authorization, it is also possible for vehicle-to-X communication to take place, e.g. using WLAN IEEE 802.11a/b/g/n/p, cellular radio (GSM, GPRS, EDGE, UMTS, LTE), WiMax, Bluetooth, etc.

In line with this exemplary embodiment, only appliances and units which are already available in the vehicle are used, in order to increase vehicle safety. The wireless driving authorization is normally also handled in a frequency band which has good physical propagation properties, and for this reason it is possible for the warnings and locating information to reach the subsequent traffic even in the case of road profiles with poor visibility. The necessary data are also so little that the low data rate of the driving authorization communication is absolutely adequate.

Thus, when an automated emergency call is sent (e.g. on the basis of airbag initiation or on the basis of manual initiation), a warning is sent using the driving authorization communication. This warning is sent as a broadcast so that all vehicles in communication range receive the warning. In this context, it is appropriate to use messages from the vehicle-to-X communication, since these are already standardized or are currently being standardized. These messages also allow the precise location of the accident to be sent and hence a more precise warning to be given in the receiving vehicles. Standardization of the communication by means of driving authorization as a whole is advantageous in this context.

Another option is to send a defined bit pattern in defined physical coding cyclically as a warning (in a similar manner to SOS using Morse code). This means that only this bit pattern needs to be standardized and the rest of the form of the communication for driving authorization, for example, is not affected thereby. In this case, it is possible to desist from transmitting the locating information.

Other causes for the sending of the warning or the locating information may be automatic braking actions on the basis of what are known as collision mitigation systems or automatic emergency braking systems or braking assistants. The warning may have a plurality of levels (that is to say respective different contents), with an accident which has actually taken place being accorded the highest warning level and the avoidance of the accident being accorded a somewhat lower warning level.

In parallel with or instead of the driving authorization communication, it is also possible to use vehicle-to-X communication.

In line with a further exemplary embodiment, the vehicle emits the locating signal after an accident. So as now to make it easier for the searching emergency workers to find the vehicle, the emergency workers can use their receiver to ask the car to sound its horn or, by way of example, to turn on the lights (headlights and tail lights, indicators, interior lighting, etc.). To prevent misuse, however, this function is enabled by the vehicle only when a locating signal has already been sent or an accident has been detected.

It is also possible for one-off locating aids, such as rocket flares, etc., to be activated in this manner. In this case, care is taken to ensure that these locating aids cannot be activated inadvertently and can be activated only if they do not present a risk.

In addition, emergency workers can use the emergency call system to request the status of the airbags in the vehicle involved in an accident and possibly to deactivate the airbags or if necessary also to set them off in order to rule out hazards for the rescue personnel during the rescue as a result of airbags going off in an uncontrolled manner. There is likewise the possibility and provision for the status of batteries and tanks to be requested (for example for the fill level of a gas tank or hydrogen tank) or else even the temperatures of particular vehicle components, for example. It is thus possible to establish whether the tanks are leaking (if the tank fill level does not remain constant) or whether there are short circuits anywhere on the vehicle, e.g. with the bodywork (if the battery is able to identify this).

The text which follows cites examples of scenarios to further clarify the mode of operation of the invention:

First Scenario:

A vehicle leaves the road, overturns and comes to lie in the bushes. An eCall is used to alert the emergency workers, who come to the site of the accident. In addition, the vehicle emits a locating signal. Since the rescue workers cannot spot the vehicle immediately, they use the locating appliance to activate the horn and the lights of the vehicle. This makes the vehicle in the bushes apparent and the vehicle occupants can be rescued promptly.

Second Scenario:

A vehicle has been found by rescue workers after an accident. The vehicle continues to emit a locating signal. The emergency workers now use this communication link to check whether the airbags have gone off and what the tank level is. In doing this, they establish that the tank is slowly leaking, and they can then take appropriate precautionary measures.

The text which follows describes yet a further exemplary embodiment of the invention:

What is known as stolen vehicle tracking (SVT) typically involves mobile radio being used to emit the (GPS) position of the stolen vehicle.

When a vehicle is reported as stolen, mobile radio or SVT can be used to trigger (that is to say enable) the emission of the locating signal. A vehicle enabled in this manner can have the lights, horn, etc. activated even from the outside by emergency workers, for example. This makes it easier to find and identify the stolen vehicle.

To make it difficult for thieves to bypass the system, the function is also enabled if there is no longer a signal from the SVT system. Thus, if thieves deactivate the SVT system, the locating signal is emitted automatically and the horn, etc., can be activated from the outside. The locating function is also coupled to the remote keyless entry (RKE) system. Thus, in order to deactivate the locating function, it is also necessary to deactivate RKE, and hence the car may become unfit to drive or unusable. By way of example, RKE and the locating function are to this end inseparably connected to one another, that is to say implemented in one computer chip, for example. This also makes it more complex for thieves to rid the car of SVT completely without restricting other functions.

The text which follows again describes two scenarios for implementing the invention:

First Scenario:

A vehicle is reported as stolen. The SVT connection is then used to enable the locating signal. A police patrol chances to pass the stolen vehicle (without knowing that it has been stolen) and receives the locating signal. The control center is then asked whether the vehicle has been reported as stolen, and if this is confirmed, the vehicle can be impounded directly. In the same step, it may also be possible to apprehend the thieves.

Second Scenario:

A vehicle is reported as stolen. The SVT connection is then used to enable the locating signal. The police approach the last transmitted GPS position of the vehicle and activate the horn and the lights of the vehicle using the radio interface. It is then a simple matter to find the vehicle even in a backstreet.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. An emergency call unit for a vehicle, said emergency call unit comprising:
   a detection unit for detecting a trigger event;
   a control unit for producing a locating signal that allows the vehicle to be located, in response to the detected event;
   a receiving unit for receiving a search signal transmitted from a remote receiver; and
   a transmission unit for transmitting the locating signal to the remote receiver in response to receiving the search signal;
   wherein when a charge of the vehicle battery is less than a threshold the transmission unit waits for the receiving unit to receive the search signal before transmitting the locating signal.

2. The emergency call unit as claimed in claim 1, wherein the transmission unit is a radio key for the vehicle or a vehicle transmitter/receiver.

3. The emergency call unit as claimed in claim 1, further comprising a position-finding unit for finding a position for the vehicle;
   wherein the locating signal is based on the position found.

4. The emergency call unit as claimed in claim 1, wherein the emergency call unit is configured for transmitting the locating signal at regular intervals of time.

5. The emergency call unit as claimed in claim 1, wherein the transmission unit is configured for transmitting the locating signal on the basis of a WLAN 802.11p standard, a WLAN 802.11 a/b/g/n standard, a WiMax standard, a Bluetooth standard or a cellular radio standard.

6. The emergency call unit as claimed in claim 1, wherein both an accident involving the vehicle and an electronic emergency call (Ecall) already sent by the vehicle are assessed by the emergency call unit as the trigger event.

7. The emergency call unit as claimed in claim 1, wherein the emergency call unit is configured for receiving a search signal which is transmitted by the receiver;
   wherein the search signal is assessed by the emergency call unit as the trigger event.

8. The emergency call unit as claimed in claim 7, wherein the search signal is assessed by the emergency call unit as the trigger event only if an accident involving the vehicle or the sending of an electronic emergency call has been detected beforehand.

9. The emergency call unit as claimed in claim 1, wherein the emergency call unit is configured for parallel transmission of the locating signal on a plurality of transmission paths.

10. The emergency call unit as claimed in claim 1, wherein the control unit forwards the locating signal and further data to the transmission unit for transmission.

11. The emergency call unit as claimed in claim 10, wherein the further data comprise a vehicle-specific rescue guideline.

12. The emergency call unit as claimed in claim 1, wherein the transmission unit is configured for transmitting the locating signal and further information to adjacent vehicles.

13. The emergency call unit as claimed in claim 1, wherein a report signal which is received by the emergency call unit and which relates to a reported theft of the vehicle is assessed by the emergency call unit as a trigger event.

14. A vehicle having an emergency call unit as claimed in claim 1.

15. A method for the repeated transmission of a locating signal by a transmission unit in a vehicle to a remote receiver on an emergency worker, said method comprising the steps of:
   detecting a trigger event;
   triggering production and transmission of a locating signal in response to the trigger event, the locating signal allowing the vehicle to be located;
   producing the locating signal;
   receiving a search signal transmitted from a remote receiver;
   transmitting the locating signal to the remote receiver in response to receiving the search signal; and
   when a charge of the vehicle battery is less than a threshold, waiting to receive the search signal, before transmitting the locating signal.

16. A non-transitory computer-readable medium which stores a program element which, when executed by a processor of an emergency call unit in a vehicle, instructs the processor to perform the following steps:
   detect a trigger event;
   trigger production and transmission of a locating signal in response to the trigger event, the locating signal allowing the vehicle to be located;
   produce the locating signal;
   receiving a search signal transmitted from a remote receiver;
   transmitting the locating signal to the remote receiver; and when a charge of the vehicle battery is less than a threshold, waiting to receive the search signal, before transmitting the locating signal.

\* \* \* \* \*

UNITED STATES PATENT AND TRADEMARK OFFICE
CERTIFICATE OF CORRECTION

PATENT NO.       : 8,682,285 B2
APPLICATION NO.  : 12/937481
DATED            : March 25, 2014
INVENTOR(S)      : Stählin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Twenty-ninth Day of September, 2015

Michelle K. Lee
*Director of the United States Patent and Trademark Office*